United States Patent

Ohtsuka

Patent Number: 5,982,949
Date of Patent: Nov. 9, 1999

[54] METHOD OF AND APPARATUS FOR PREDICTING IMAGE

[75] Inventor: Shuichi Ohtsuka, Kanagawa-ken, Japan

[73] Assignee: Fuji Photo Film Co., Ltd., Kanagawa-ken, Japan

[21] Appl. No.: 08/508,723

[22] Filed: Jul. 28, 1995

[30] Foreign Application Priority Data

Sep. 21, 1994 [JP] Japan .................................. 6-226456

[51] Int. Cl.⁶ .............................. G06K 9/00; G06K 9/36; H04N 1/46
[52] U.S. Cl. ......................... 382/276; 382/167; 358/500; 358/501; 358/515
[58] Field of Search .................................. 382/276, 167, 382/131; 358/518, 523, 501, 531, 527, 534, 500, 515

[56] References Cited

U.S. PATENT DOCUMENTS

| | | | |
|---|---|---|---|
| 3,801,736 | 4/1974 | Kosaka et al. | 358/534 |
| 4,701,790 | 10/1987 | Yamada | 358/515 |
| 5,046,108 | 9/1991 | Inoue et al. | 382/131 |
| 5,126,838 | 6/1992 | Ohsawa et al. | 358/500 |
| 5,172,224 | 12/1992 | Collette et al. | 358/80 |
| 5,508,826 | 4/1996 | Lloyd et al. | 358/501 |
| 5,552,905 | 9/1996 | Tanaka | 358/523 |

FOREIGN PATENT DOCUMENTS

| | | | |
|---|---|---|---|
| A2 0350870 | 1/1990 | European Pat. Off. | H04N 1/46 |
| A2 0660590 | 6/1995 | European Pat. Off. | H04N 1/60 |
| WO 9007837 | 7/1990 | WIPO | H04N 1/46 |

Primary Examiner—Phuoc Tran
Assistant Examiner—Daniel G. Mariam
Attorney, Agent, or Firm—Sughrue, Mion, Zinn, Macpeak & Seas, PLLC

[57] ABSTRACT

A standard conversion table setting unit establishes a standard conversion table for converting YMCK halftone dot percentage data supplied from an image editor into color image data in a common color space for generating a predicted image under standard output conditions to produce a final image. A differential parameter setting unit establishes differences between the standard output conditions and actual output conditions as differential parameters. A differential conversion table setting unit establishes differences between the standard conversion table and a conversion table for producing a predicted image corresponding to the final image generated under the actual output conditions, as a differential conversion table based on the differential parameters. The conversion table corresponding to the actual output conditions is generated using the standard conversion table and the differential conversion table, and image data to produce the predicted image are generated with the conversion table.

13 Claims, 1 Drawing Sheet

METHOD OF AND APPARATUS FOR PREDICTING IMAGE

BACKGROUND OF THE INVENTION

1. Field of the Invention

The present invention relates to a method of and an apparatus for predicting an image as a visible image which corresponds to a final image produced from image data that have been processed as desired.

2. Description of the Related Art

In recent years, there have widely been used printing systems for reading an image from an original document such as a photograph, a painting, or the like or processing image data supplied from an image input device and producing a printed material using a film original plate or a press plate.

Such a printed material is produced according to a number of processing steps. More specifically, color separation films of Y, M, C, K are produced on the basis of image data supplied from an image input device, and presensitized plates are exposed through each of the color separation films. Then, the presensitized plates are developed, and are set on a printing press to produce a color printed material. The quality of the printed material which is finally produced depends on various printing conditions (output conditions) including the paper, inks, and water used, the type of the printing press, and the screen ruling and dot configuration which are employed for the formation of dot-matrix images. In producing a printed image based on the above a number of processing steps and conditions, it is important to produce a predicted image in advance by outputting processed image data on a CRT, a printer, or the like, determine whether the predicted image is acceptable or not, and correct the converting or printing conditions if necessary.

The predicted image is required to have the equivalent image characteristics to those of a printed image by calorimetrically matching the individual colors of the pixels of the predicted image with those of the printed image, establishing formulas for matching output conditions such as optical characteristics depending upon the output method and resolution of output devices used, and the properties of a support layer for the printed image such as optical scattering, surface reflections, etc., and converting the image data supplied from the image input device according to the established formulas.

However, it is highly difficult to match in all the output conditions. Determining the image data of a predicted image according to the formulas which employ physical parameters related to a number of printed images is not practical as the processing operation is considerably time-consuming.

SUMMARY OF THE INVENTION

It is therefore an object of the present invention to provide a method of and an apparatus for quickly generating a predicted image that highly accurately corresponds, in appearance, to a finally produced image under desired output conditions.

To achieve the above object, there is provided in accordance with the present invention an apparatus for predicting an image as a visible image which corresponds to a final image generated from image data that have been processed, comprising standard conversion table setting means for establishing a standard conversion table to convert the image data into image data for generating a predicted image, based on standard output conditions for generating a final image, differential parameter setting means for establishing differences between the standard output conditions and actual output conditions as differential parameters, differential conversion table setting means for establishing differences between the standard conversion table and a conversion table for producing a predicted image corresponding to the final image generated under the actual output conditions, as a differential conversion table based on the differential parameters, and means for generating the conversion table corresponding to the actual output conditions using the standard conversion table and the differential conversion table, and generating image data to produce the predicted image with the conversion table.

According to the present invention, there is also provided a method of predicting an image as a visible image which corresponds to a final image generated from image data that have been processed, comprising the steps of establishing a standard conversion table LUT0 to convert the image data into image data for generating a predicted image, based on standard output conditions for generating a final image, establishing differences between the standard output conditions and actual output conditions as differential parameters Pi, Pj, determining a conversion table LUT for producing a predicted image corresponding to the final image generated under the actual output conditions, based on the differential parameters Pi, Pj, as:

$$LUT = LUT0 + \sum_{i=1}^{n} \Delta LUTi * Pi + \sum_{i=1}^{n} \Delta LUT2i * Pi^2 + \sum_{ij=1}^{n} \Delta LUT2ij * Pi * Pj + \dots$$

where $\Delta LUTi$ represents a first-order differential conversion table, $\Delta LUT2i$, $\Delta LUT2ij$, ... represent second-order differential conversion tables, as differences between the conversion table LUT and the standard conversion table LUT0, i, j represent corresponding respective output conditions, and generating image data to produce the predicted image with the conversion table LUT.

With the above arrangement, the conversion table LUT is generated from the preset standard conversion table LUT0 corresponding to the standard output conditions, the differential parameters Pi, Pj, ... indicative of the differences which are deviations of desired output conditions from the standard output conditions, and the preset differential conversion tables $\Delta LUTi$, $\Delta LUT2i$, $\Delta LUT2ij$, ... corresponding to the differential parameters Pi, Pj, ... The image data are converted using the conversion table LUT to quickly produce the predicted image with a desired degree of accuracy.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
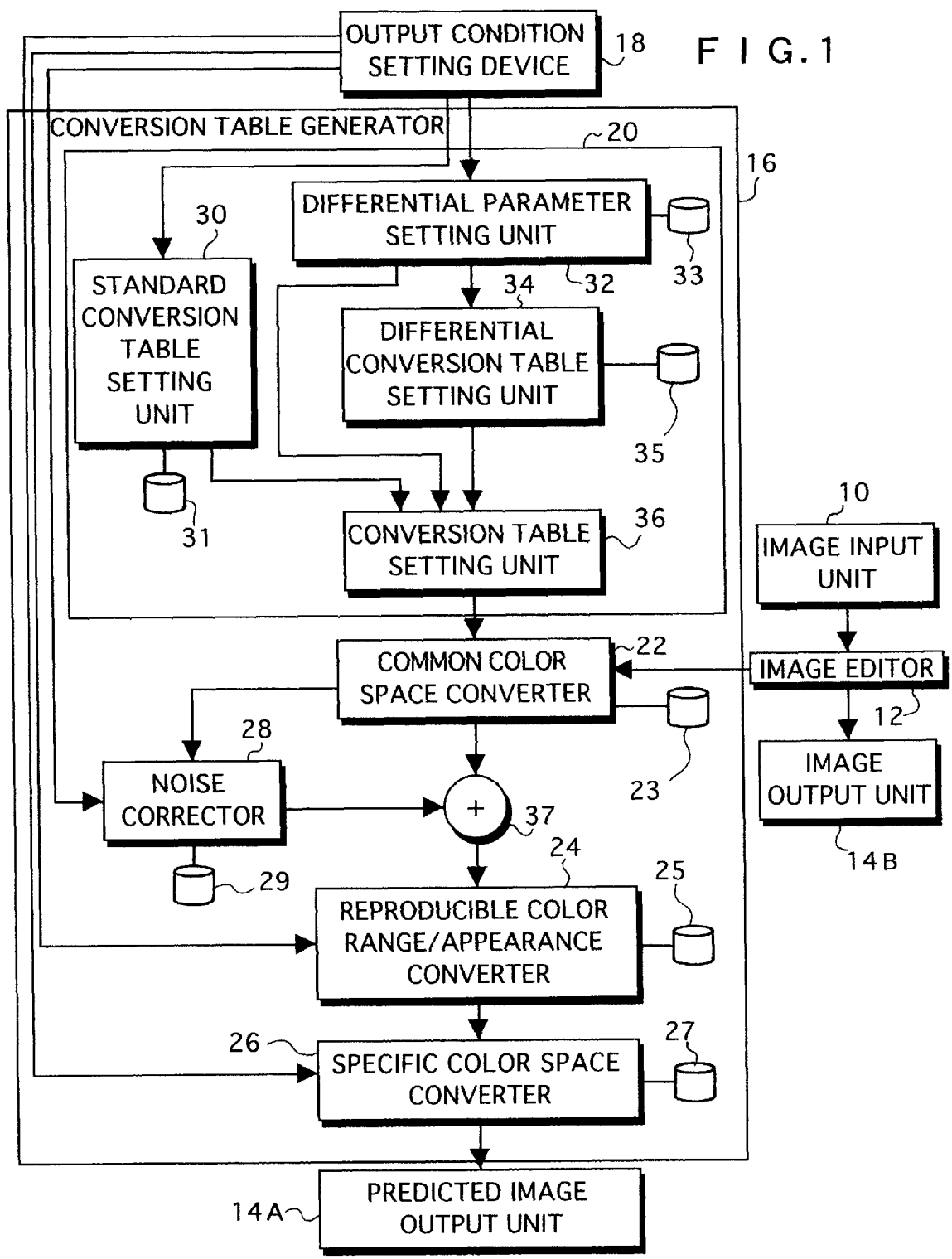
FIG. 1 is a block diagram of a color printing system which incorporates an apparatus for predicting a color image according to the present invention.

As shown in FIG. 1, a color printing system which incorporates an apparatus for predicting a color image according to the present invention generally comprises an image input unit 10 for reading color image data from a color original document or an external device, an image editor 12 for effecting image processing including an aesthetic process on the color image data thus read by the image input unit 10, a predicted image output unit 14A for displaying or outputting an image predicted from the processed color image data on a CRT, a color printer, or the like, an image output unit 14B for outputting the processed color image as a printed image on a printed material, an image processor 16 for converting the color image data into color image data that can be handled by the predicted image output unit 14A taking into account the output method of the image output unit 14B and output conditions such as an output medium, etc., and an output condition setting device 18 for establishing output conditions including characteristics of the image output units 14A, 14B, characteristics of a color reproduction process and color reproduction mediums including color forming materials, a support layer, phosphors, etc., and printing conditions, etc.

The image input unit 10 has three or more sensors having different spectral sensitivities for reading the image densities of pixels of a color original document. For example, the image input unit 10 may comprise a drum-type scanner for reading the image densities of pixels of a color original document mounted on a drum in synchronism with rotation of the drum, or a flatbed scanner for reading the image densities of pixels of a color original document with either a line sensor composed of a single array or a plurality of arrays of photoelectric transducers or a two-dimensional sensor composed of a two-dimensional matrix of photoelectric transducers.

The image editor 12 effects image processing including an aesthetic process on the color image data from the image input unit 10 to generate YMCK halftone dot percentage data supplied to the image output unit 14B.

The image output unit 14B produces Y, M, C, K color separation films based on the YMCK halftone dot percentage data supplied as color image data from the image editor 12, produces presensitized plates from each of the Y, M, C, K color separation films, and then produces a color printed material from the presensitized plates. The image output unit 14B includes a printing press.

The predicted image output unit 14A may comprise a CRT, a color printer, or the like for displaying or outputting a color image having the equivalent color representation and image quality to the printed material to be produced by the image output unit 14B.

The image processor 16 comprises a conversion table generator 20 for generating a conversion table for converting YMCK halftone dot percentage data supplied as color image data from the image editor 12 into color image data in a common color space such as of an XYZ calorimetric system, a common color space converter 22 for converting YMCK halftone dot percentage data using the conversion table generated by the conversion table generator 20, a reproducible color range/appearance converter 24 for converting a reproducible color range of the image input unit 10 in the common color space into a reproducible color range of the predicted image output unit 14A, and making appearance adjustments depending on the difference between observing conditions, a specific color space converter 26 for converting the color image data in the common color space into color image data in the specific color space of the predicted image output unit 14A, and a noise corrector 28 for correcting the color image data in the common color space which is produced by the common color space converter 22, for noise which would appear on a printed image. The noise corrector 28 corrects the color image data for periodic noise such as a moiré pattern, a rosette pattern, or the like on a printed image, and random noise produced due to the output characteristics of a printing press.

The common color space is a color space composed of data not depending on the input and output units and the output medium, such as a CIE-XYZ colorimetric system, an L*a*b* colorimetric system, an YCC calorimetric system which can uniquely be converted mathematically to and from the CIE-XYZ calorimetric system or the L*a*b* calorimetric system, a YIQ calorimetric system, or an RGB calorimetric system representing the phosphors of a display monitor such as a CRT or the like. It is therefore possible to carry out desired image processing in the common color space without concern over the input and output units and the output medium. The specific color space is a color space composed of particular data formats handled by the image input unit 10 and the predicted image output unit 14A.

The conversion table generator 20 comprises a standard conversion table setting unit 30 for establishing a standard conversion table for converting color image data into color image data in the common color space under standard output conditions of the image output unit 14B, a differential parameter setting unit 32 for establishing differences between the standard output conditions and actual output conditions as differential parameters for the respective output conditions, a differential conversion table setting unit 34 for establishing differences between the standard conversion table and a conversion table for actual conversion processing as a differential conversion table, and a conversion table setting unit 36 for establishing a desired conversion table using the standard conversion table, the differential parameters, and the differential conversion table.

A process of predicting an image with the color printing system shown in FIG. 1 will be described below.

A conversion table for producing color image data in the common color space is represented by a standard conversion table preset depending on the standard output conditions of the image output unit 14B, a differential conversion table preset as differences between the standard conversion table and the conversion table, and differential parameters corresponding to differences between the standard output conditions and actual output conditions. Specifically, a conversion table LUT is expressed according to the Taylor expansion by:

$$LUT = LUT0 + \sum_{i=1}^{n} \Delta LUTi * Pi + \sum_{i=1}^{n} \Delta LUT2i * Pi^2 + \sum_{ij=1}^{n} \Delta LUT2ij * Pi * Pj + \dots \quad (1)$$

where LUT0 represents a standard conversion table, ΔLUTi a first-order differential conversion table, ΔLUT2i, ΔLUT2ij, . . . represent second-order differential conversion tables, Pi and Pj represent differential parameters indicating differences between standard and actual output conditions, and i, j represent corresponding respective output conditions. The standard output conditions are indicative of the standard output method of the image output unit 14B, the type of a standard ink used for recording, and the type of a standard recording medium. By thus establishing the differential conversion table in advance with respect to the differences between the standard and actual output conditions, it is possible to generate color image data in the common color space quickly with a desired degree of accuracy.

A specific process of establishing the conversion table LUT will be described below.

If color image data supplied from the image editor 12 are YMCK halftone dot percentage data, then the color image data can be converted into color image data in the XYZ colorimetric system as follows, using the Neugebauer's equation which is a color-predicting basic function expressed by the following equation (2):

$$
\begin{aligned}
X = &\ X_c \cdot c_X \cdot (1-m_X) \cdot (1-y_X) \cdot (1-k_X) + \\
    &\ X_m \cdot m_X \cdot (1-c_X) \cdot (1-y_X) \cdot (1-k_X) + \\
    &\ X_y \cdot y_X \cdot (1-c_X) \cdot (1-m_X) \cdot (1-k_X) + \\
    &\ X_k \cdot k_X \cdot (1-c_X) \cdot (1-m_X) \cdot (1-y_X) + \\
    &\ X_w \cdot (1-k_X) \cdot (1-c_X) \cdot (1-m_X) \cdot (1-y_X) + \\
    &\ X_{cm} \cdot c_{Xm} \cdot m_{Xc} \cdot (1-y_X) \cdot (1-k_X) + \\
    &\ X_{cy} \cdot c_{Xy} \cdot y_{Xc} \cdot (1-m_X) \cdot (1-k_X) + \\
    &\ X_{ck} \cdot c_{Xk} \cdot k_{Xc} \cdot (1-m_X) \cdot (1-y_X) + \\
    &\ X_{my} \cdot m_{Xy} \cdot y_{Xm} \cdot (1-c_X) \cdot (1-k_X) + \\
    &\ X_{mk} \cdot m_{kX} \cdot k_{Xm} \cdot (1-c_X) \cdot (1-y_X) + \\
    &\ X_{yk} \cdot y_{Xk} \cdot k_{Xy} \cdot (1-c_X) \cdot (1-m_X) + \\
    &\ X_{cmy} \cdot c_{Xmy} \cdot m_{Xcy} \cdot y_{Xcm} \cdot (1-k_X) + \\
    &\ X_{cmk} \cdot c_{Xmk} \cdot m_{Xck} \cdot k_{Xcm} \cdot (1-y_X) + \\
    &\ X_{myk} \cdot m_{Xyk} \cdot y_{Xmk} \cdot k_{Xmy} \cdot (1-c_X) + \\
    &\ X_{cyk} \cdot c_{Xyk} \cdot y_{Xck} \cdot k_{Xcy} \cdot (1-m_X) + \\
    &\ X_{cmyk} \cdot c_{Xmyk} \cdot m_{Xcyk} \cdot y_{Xcmk} \cdot k_{Xcmy}
\end{aligned} \quad (2)
$$

$$Y = Y_C \cdot c_Y \cdot (1-m_Y) \cdot (1-y_Y) \cdot (1-k_Y) + \ldots$$
$$Z = Z_C \cdot c_Z \cdot (1-m_Z) \cdot (1-y_Z) \cdot (1-k_Z) + \ldots$$

(first-order color term, second-order color term, third-order color term, fourth-order color term)

where X, Y, Z represent tristimulus values in the XYZ colorimetric system, $X_c$, $X_m$, $X_y$, $X_k$, etc. represent XYZ stimulus values (single-color stimulus values) with respect to single-color inks of Y, M, C, and K, $X_w$, etc. represent tristimulus values of the support layer of the printed material, $X_{cm}$, $X_{cmy}$, $X_{cmyk}$, etc. represent XYZ stimulus values (higher-order color stimulus values) of an area where inks are superimposed, e.g., $X_{cm}$ represents XYZ stimulus values of an area where inks of C and M are superimposed, $c_X$, $m_X$, $y_X$, $k_X$, etc. represent halftone dot percentage values of inks of C, M, Y, K at the time they are observed with color light corresponding to color matching functions $x(\lambda)$, and $c_{Xm}$, $c_{Xmy}$, $c_{Xcyk}$, etc. represent dot % values of an ink of C at the time it is observed with color light corresponding to the color matching functions $x(\lambda)$, e.g., $c_{Xmy}$ represents a dot % value for making a correction with respect to the presence of the inks of M and Y (higher-order color dot gain correction). Since the XYZ calorimetric system has a one-to-one correspondence to the L*a*b* calorimetric system, the Neugebauer's equation can be defined as an equation indicative of the relationship between the L*a*b* colorimetric system and the YMCK colorimetric system.

If it is assumed that the halftone dot percentage values of inks of C, N, Y, K are established by respective four-dimensional tables, the numbers of grid points of the tables are indicated respectively by k, l, m, n, and the tristimulus values X, Y, Z corresponding to the values of C, M, Y, K of the grid points are indicated respectively by X(klmn: Pi, Pj, . . . ), Y(klmn: Pi, Pj, . . . ), and Z(klmn: Pi, Pj, . . . ) where Pi, Pj, . . . represent differential parameters, then the tristimulus values X(klmn: Pi, Pj, . . . ), Y(klmn: Pi, Pj, . . . ), and Z(klmn: Pi, Pj, . . . )are expressed as follows:

$$X(klmn:\ Pi, Pj, \ldots) = X(klmn:\ Pi=0, Pj=0, \ldots) + \frac{\partial X(klmn:\ Pi=0, Pj=0, \ldots)}{\partial xPi} \cdot Pi + \frac{\partial X(klmn:\ Pi=0, Pj=0, \ldots)}{\partial Pj} \cdot Pj + \ldots \quad (3)$$

$$Y(klmn:\ Pi, Pj, \ldots) = Y(klmn:\ Pi=0, Pj=0, \ldots) + \frac{\partial Y(klmn:\ Pi=0, Pj=0, \ldots)}{\partial Pi} \cdot Pi + \frac{\partial Y(klmn:\ Pi=0, Pj=0, \ldots)}{\partial Pj} \cdot Pj + \ldots$$

$$Z(klmn:\ Pi, Pj, \ldots) = Z(klmn:\ Pi=0, Pj=0, \ldots) + \frac{\partial Z(klmn:\ Pi=0, Pj=0, \ldots)}{\partial Pi} \cdot Pi + \frac{\partial Z(klmn:\ Pi=0, Pj=0, \ldots)}{\partial Pj} \cdot Pj + \ldots$$

where X(klmn: Pi=0, Pj=0, . . . ), Y(klmn: Pi=0, Pj=0, . . . ), Z(klmn: Pi=0, Pj=0, . . . ) indicate tristimulus values X, Y, Z of printed images at the grid point numbers k, l, m, n outputted by the image output unit 14B under the standard output conditions. These tristimulus values X, Y, Z are measured in advance, and stored as a standard conversion table LUT0 in a data file 31 connected to the standard conversion table setting unit 30.

Then, partial derivatives of X(klmn: Pi=0, Pj=0, . . . ), Y(klmn: Pi=0, Pj=0, . . . ), Z(klmn: Pi=0, Pj=0, . . . ) with respect to the differential parameter Pi are determined. If the differential parameter Pi represents the deviation of the actual density of the ink of C from the standard density of the ink of C, then those terms of the stimulus values X of the Neugebauer's equation (2) which have partial derivatives are eight terms containing the variables $X_c$, $X_{cm}$, $X_{cy}$, $X_{ck}$, $X_{cmy}$, $X_{cmk}$, $X_{cyk}$, $X_{cmyk}$. It can be supposed here that a change of density from the standard density is small for the terms indicative of superimposition with the ink of K and the terms indicative of superimposition of the inks Y, M, C. Therefore, a first-order partial derivative term with respect to the differential parameter Pi is expressed by:

$$\frac{\partial X(klmn:\ Pi=0, Pj=0, \ldots)}{\partial Pi} = \frac{\partial X_c}{\partial Pi} \cdot c_X \cdot (1-m_X) \cdot (1-Y_X) \cdot (1-K_X) + \frac{\partial X_{cm}}{\partial Pi} \cdot c_{Xm} \cdot m_{Xc} \cdot (1-Y_X) \cdot (1-K_X) + \frac{\partial X_{cy}}{\partial Pi} \cdot c_{Xy} \cdot y_{Xc} \cdot (1-m_X) \cdot (1-k_X) \quad (4)$$

where $c_X$, $m_X$, $y_X$, $k_X$ represent YMCK halftone dot percentage values which is corrected based on the dot gain difference between the dot gains outputted under the standard output conditions and those of the predicted image for the stimulus values X, and can be determined from the characteristic data of the ink of C that is actually used, $c_{Xy}$, $y_{Xc}$ can be determined from the characteristic data in regions where the ink of C that is actually used and the standard ink of Y are superimposed, and $\partial X_c/\partial Pi$, $\partial X_{cm}/\partial Pi$, $\partial X_{cy}/\partial Pi$ represent, respectively, a difference of the stimulus value X of the first-order color of the ink of C when the ink density of C as an output condition differs a unit quantity from the standard density, a difference of the stimulus value X of the second-order color of the ink of C on the ink of M, and a difference of the stimulus value X of the second-order color of the ink of C on the ink of Y, and can be determined by measuring the characteristics of the respective inks.

The item of the difference between the standard value of the support layer's tristimulus values and the predicting value thereof can be added to the equation (4) for a differential parameter such like the difference between the predicting value of both ink density and ink dot gain and the output under the standard condition as described above.

Therefore, the first-order partial derivative term expressed by the equation (4) can be determined as a first-order differential conversion table ΔLUTi with respect to the differential parameter Pi. The first-order differential conversion table ΔLUTi is stored in a data file 35 connected to the differential conversion table setting unit 34. Similarly, a first-order differential conversion table ΔLUTi, second-order differential conversion tables ΔLUT2i, ΔLUT2ij, . . . with respect to the differential parameters Pi, Pj are determined and stored in the data file 35.

After the above preparatory process has been completed, data processing operation of the color printing system is carried out.

First, the operator determines system configurations including the image output unit 14B, the type of an original document on which a color image is recorded, an output medium, the type of inks used for recording a color image, and an output format, etc., and establishes these output conditions in the output condition setting device 18. The output condition setting device 18 supplies the output wconditions to the conversion table generator 20, the noise corrector 28, the reproducible color range/appearance converter 24, and the specific color space converter 26 of the image processor 16.

The standard conversion table setting unit 30 of the conversion table generator 20 which has been supplied with the output conditions reads the standard conversion table LUT0 corresponding to standard output conditions from the data file 31, and supplies the standard conversion table LUT0 to the conversion table setting unit 36. At this time, a plurality of standard conversion tables LUT0 may be established with respect to basic output conditions, and one of the standard conversion tables LUT0 which corresponds to standard output conditions closest to the supplied output conditions may be selected. The differential parameter setting unit 32 of the conversion table generator 20 which has been supplied with the output conditions reads differential parameters Pi, Pj, . . . corresponding to differences between the output conditions and the standard output conditions from a data file 33 connected thereto, and supplies the read differential parameters Pi, Pj, . . . to the differential conversion table setting unit 34. The differential conversion table setting unit 34 selects differential conversion tables ΔLUTi, ΔLUT2i, ΔLUT2ij, . . . corresponding to the differential parameters Pi, Pj, . . . , and supplies the selected differential conversion tables ΔLUTi, ΔLUT2i, ΔLUT2ij, . . . to the conversion table setting unit 36. The conversion table setting unit 36 establishes a conversion table LUT according to the equation (1) using the standard conversion table LUT0 supplied from the standard conversion table setting unit 30 and the differential conversion tables ΔLUTi, ΔLUT2i, ΔLUT2ij, . . . supplied from the differential conversion table setting unit 34, and supplies the established conversion table LUT to the common color space converter 22. The common color space converter 22 stores the supplied conversion table LUT in a data file 23 connected thereto.

The operator operates the image input unit 10 to read color image data of a color original document. The image input unit 10 supplies the color image data as RGB data, for example, to the image editor 12, which effects desired image processing on the RGB data, and supplies the processed RGB data as YMCK halftone dot percentage data to the image processor 16 and the image output unit 14B.

In the image processor 16, the common color space converter 22 converts the YMCK halftone dot percentage data supplied from the image editor 12 with the conversion table LUT that has been established by conversion table generator 20. As a result, the YMCK halftone dot percentage data are converted into tristimulus values X, Y, Z in the common color space taking into account the output medium and the types of the inks in the image output unit 14B. This conversion process is carried out at a very high speed because it is performed simply by searching the four-dimensional tables for corresponding data, rather than directly solving complex formulas such as the Neugebauer's equation (2). Since a conversion table LUT of desired accuracy can be generated by using a differential conversion table of desired order, it is possible to obtain tristimulus values X, Y, Z of desired accuracy.

Then, the noise corrector 28 generates corrective data for reproducing periodic noise and random noise of a printed image to be outputted by the image output unit 14B, based on the tristimulus values X, Y, Z. The corrective data generated by the noise corrector 28 are added to the tristimulus values X, Y, Z by an adder 37. The periodic noise represents a periodic image structure such as a moire pattern, a rosette pattern, or the like appearing on a printed image. The random noise is a noise that appears on a printed image due to nonuniform application of the inks to the recording medium or unsteady variations of the status of the printing press. These noises are read from a data file 29 based on the output conditions and the tristimulus values X, Y, Z, and added to the tristimulus values X, Y, Z. The corrective data may be established in advance as being included in the standard conversion table and the differential conversion table, and the common color space converter 22 may convert the YMCK halftone dot percentage data according to a process including noise correction, without the noise corrector 28 being relied upon for noise correction.

The tristimulus values X, Y, Z thus corrected are then processed by the reproducible color range/appearance converter 24 to adjust the reproducible color range in the predicted image output unit 14A and make appearance adjustments according to a table read from a data file 25 depending on the output conditions. Then, the tristimulus values X, Y, Z are converted by the specific color space converter 26 into color image data in the specific color space of the predicted image output unit 14A according to a table read from a data file 27 depending on the output conditions.

The predicted color image data thus obtained are then outputted as a hard copy or displayed on the CRT by the predicted image output unit 14A. The operator confirms the outputted/displayed predicted color image. If the operator observes no problem with respect to the appearance such as color rendition, image structure, etc., then the operator operates the image output unit 14B to produce a printed material. If there is a problem, then the color image data are processed again in the image editor 12, necessary correction is given to the printing conditions, and thus produced YMCK halftone dot percentage data are monitored again and repeatedly if necessary.

Although a certain preferred embodiment of the present invention has been shown and described in detail, it should be understood that various changes and modifications may be made therein without departing from the scope of the appended claims.

What is claimed is:

1. An apparatus for predicting an image as a visible image which corresponds to a final image generated from intial image data that have been processed, comprising:

a predetermined standard conversion table to convert the initial image data into image data for generating a predicted image, based on standard output conditions for generating a final image;

predetermined differential conversion tables establishing differences between said standard conversion tables and a conversion table for producing a predicted image corresponding to the final image generated under actual output conditions;

differential parameter setting means for establishing differences between the standard output conditions and the actual output conditions as differential parameters;

means for setting one or more of said predetermined differential conversion tables as a selected differential conversion table based on said differential parameters; and means for generating said conversion table using said standard conversion table and said differential conversion table, and generating image data to produce said predicted image with said conversion table.

2. An apparatus according to claim 1, further comprising;

said image data to produce said predicted image comprising color image data in a common color space, and means for converting said color image data in the common color space into image data supplied to an image output unit outputting the predicted image.

3. A method of predicting an image as a visible image which corresponds to a final image generated from intial image data that have been processed, comprising the steps of:

providing a predetermined standard conversion table LUT0 to convert the initial image data into image data for generating a predicted image, based on standard output conditions for generating said final image;

providing a plurality of predetermined differential conversion tables representing differences between the said standard conversion table and a conversion table, wherein said conversion table is a table adapted to produce said predicted image corresponding to said final image under actual output conditions;

setting differential parameters Pi, Pj representing differences between said standard output conditions and said actual output conditions;

selecting at least one of said plurality of predetermined differential conversion tables based on a corresponding to said differential parameters Pi, Pj;

calculating a determined conversion table LUT based on said standard conversion table LUT0 and said at least one of said plurality of predetermined differential conversion tables; and generating image data to produce the predicted image with said determined conversion table LUT.

4. A method according to claim 3, wherein said image data to produce said predicted image comprise color image data in a common color space, further comprising the step of converting said color image data in the common color space into image data for being supplied to an image output unit for outputting the predicted image.

5. A method according to claim 3 or 4, wherein said step of establishing differences comprises the step of establishing differences between ink densities of a printed material outputted under said standard output conditions and ink densities of a printed material predicted by said predicted image, as said differential parameters.

6. A method according to claim 3 or 4, wherein said step of establishing differences comprises the step of establishing differences between ink dot gains of a printed material outputted under said standard output conditions and ink dot gains of a printed material predicted by said predicted image, as said differential parameters.

7. A method according to claim 3 or 4, wherein said step of establishing differences comprises the step of establishing differences between the tristimulus values of a support layer of a printed material outputted under said standard output conditions and tristimulus values of a support layer of a printed material predicted by said predicted image, as said differential parameters.

8. The apparatus according to claim 1, wherein said plurality of differential conversion tables include a first-order differential conversion table and second-order differential conversion tables.

9. The apparatus according to claim 1, further comprising:

a first image output unit which produces said final image from said initial image data; and a second image output unit which produces said predicted image from said image data for generating a predicted image.

10. The apparatus according to claim 1, further comprising:

a noise corrector which generates corrective data for reproducing noise of the final image to be printed, the corrective data being added to the image data for generating a predicted image.

11. The method according to claim 3, wherein said at least one differential conversion table includes a first-order differential conversion table and second-order differential conversion tables.

12. The method according to claim 3, further comprising the steps of:

producing said final image from said initial image data; and producing said predicted image from said image data for generating a predicted image.

13. The method according to claim 3, further comprising the steps of:

generating corrective data for reproducing noise of the final image to be printed; and adding the corrective data to the image data for generating a predicted image.

* * * * *